United States Patent [19]
Dudley

[11] Patent Number: 5,054,294
[45] Date of Patent: Oct. 8, 1991

[54] COMPRESSOR DISCHARGE TEMPERATURE CONTROL FOR A VARIABLE SPEED COMPRESSOR

[75] Inventor: Kevin F. Dudley, Cazenovia, N.Y.

[73] Assignee: Carrier Corporation, Syracuse, N.Y.

[21] Appl. No.: 586,128

[22] Filed: Sep. 21, 1990

[51] Int. Cl.$^5$ .............................................. F25B 49/00
[52] U.S. Cl. ..................... 62/228.4; 62/126; 62/158
[58] Field of Search ................. 62/228.4, 228.5, 228.3, 62/228.1, 126, 129, 215, 231, 157, 158, DIG. 17

[56] References Cited

U.S. PATENT DOCUMENTS

| | | | |
|---|---|---|---|
| 4,220,010 | 9/1980 | Mueller et al. | 62/126 |
| 4,517,812 | 5/1985 | Umezu | 62/228.5 |
| 4,563,878 | 1/1986 | Baglione | 62/158 X |
| 4,689,967 | 9/1987 | Han et al. | 62/217 X |
| 4,735,058 | 4/1988 | Umezu et al. | 62/228.4 X |

Primary Examiner—Harry B. Tanner

[57] ABSTRACT

In an air conditioning system with a variable speed compressor drive, the discharge temperature is sensed and if it is found to exceed a predetermined threshold limit for a predetermined period of time, then the compressor speed is reduced by an incremental amount. If this condition persists, the compressor speed will continue to be reduced in incremental steps until the temperature of the discharge gas is reduced to a level below the predetermined threshold limit.

10 Claims, 1 Drawing Sheet

COMPRESSOR DISCHARGE TEMPERATURE CONTROL FOR A VARIABLE SPEED COMPRESSOR

BACKGROUND OF THE INVENTION

This invention relates generally to air conditioning systems and, more particularly, to a method and apparatus for varying the speed of a compressor in an air conditioning system to control the discharge temperature thereof.

Air conditioning and heat pump systems of the type commonly used for residential and light commercial application are commonly driven by hermetic compressors. In such a system it is desirable to provide a means for protecting the compressor from overload conditions which may occur, for example, in extreme weather conditions, by improper use of the system, or by a malfunction of certain components in the system. Typically this protection has been provided by a sensing of the discharge pressure of the compressor and a shutting down of the system in the event of extreme pressures being detected.

Variable speed motors are now available and are being used for driving not only the compressor but also the fans for both the outdoor and indoor coils. With this flexibility in operating speeds, it is possible to obtain higher operating efficiencies over variable load and ambient conditions. Further, in a case of the compressor drive motor, rather than shutting the compressor down when excessive discharge pressures are sensed, it is possible to simply reduce the compressor speed in order to relieve the compressor from the excessive operating condition.

If the suction pressure to the compressor remains constant, the discharge pressure will be representative of the discharge gas temperature. However, if the suction pressure varies, as may occur because of changes in the ambient or system conditions, then the operating temperature of the compressor may become excessive, even though the discharge pressure has not exceeded the allowed threshold limit. For example, if there is a loss of refrigerant by way of leakage or the like, the suction pressure will go down and the discharge temperature will tend to go up. Similarly, if there is a restriction in refrigerant flow as may be caused by a kink in the refrigerant line, the suction pressure will be reduced and the discharge temperature will tend to rise. Further, as the temperature of the ambient air flowing across the evaporator is reduced, suction pressure is reduced and the discharge temperature will tend to rise.

If the operating temperature of the compressor becomes excessive, damage maybe caused in various ways. For example, when exposed to relatively high temperatures, the insulation in the motor may degrade and eventually cause a short circuit. Further, at high temperatures the lubricating oil tends to break down and that, in turn, will cause excessive wear and possible failure of various components within the compressor.

It is therefore an object of the present invention to provide an improved method and apparatus for protecting a compressor from overtemperature conditions.

Another object of the present invention is the provision for protecting a variable speed compressor from overtemperature conditions.

Yet another object of the present invention is that of protecting a variable speed compressor from overtemperature conditions during periods when the discharge pressure does not become excessive.

Yet another object of the present invention is the provision for a variable speed compressor control system which is economical to manufacture, and effective in use.

These objects and other features and advantages become more readily apparent upon reference to the following description when taken in conjunction with the appended drawings.

SUMMARY OF THE INVENTION

Briefly, in accordance with one aspect of the invention, the temperature of the discharge gas from a variable speed compressor is sensed, and when that temperature exceeds a predetermined level, the speed of the compressor is responsively reduced so that the temperature of the discharge gas is also reduced.

By yet another aspect of the invention, the controller for a variable speed compressor operates to reduce the speed of the compressor in response to the sensing of a high discharge gas temperature only after that discharge temperature exceeds a predetermined threshold for a predetermined period of time.

But yet another aspect of the invention, the control system for a variable speed compressor operates to further reduce the speed of the compressor if the excessive discharge gas temperature condition persists. Thus, so long as the sensed temperature condition remains above the allowed level, the speed of compressor will be progressively decreased in steps, until the temperature of the discharge gas is finally reduced below the allowed limit.

By yet another aspect of the invention, if the sensed temperature of the discharge gas reaches a predetermined limit higher than that established for reduction of compressor motor speed, then it is assumed that simply reducing the motor speed is not sufficient, and the system is shut down.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
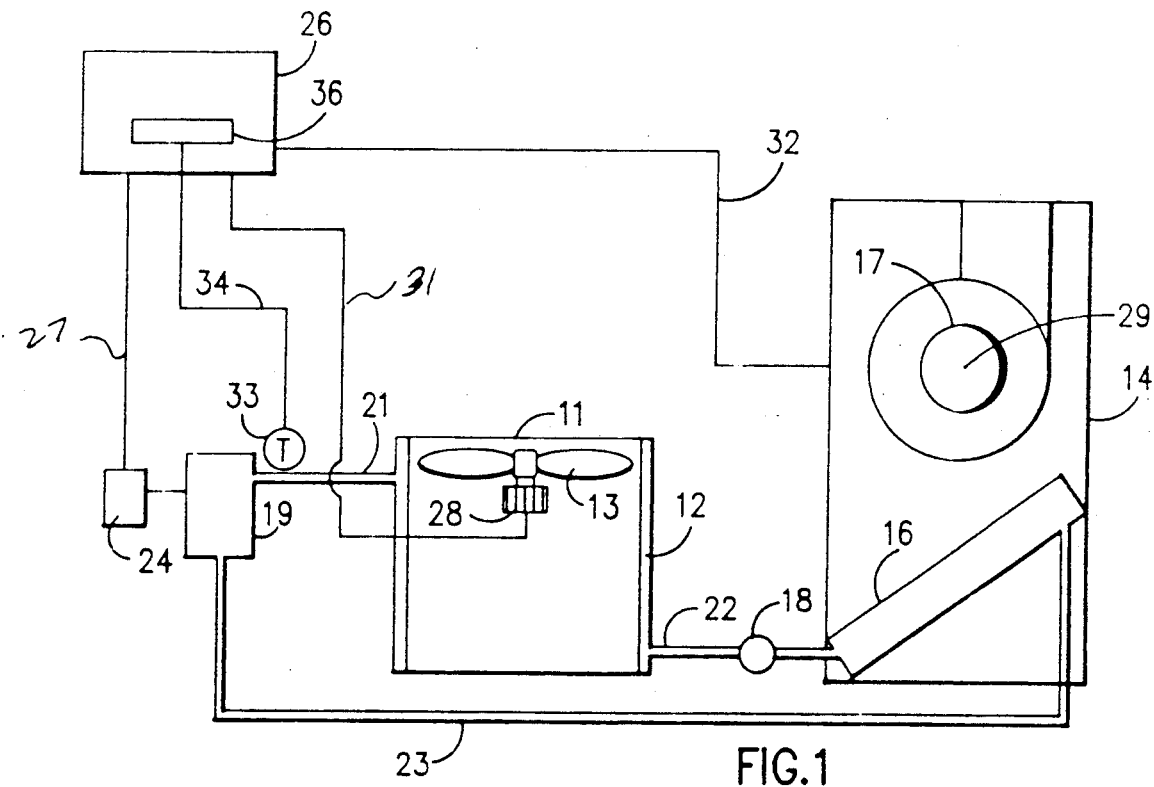
FIG. 1 is a schematic illustration of an air conditioning system in accordance with the present invention.

Referring now to FIG. 1, there is shown a typical air conditioning system with the present invention incorporated therein. The conventional refrigeration circuit includes: an outdoor unit 11, including a coil 12 and fan 13; an indoor unit 14, including a heat exchanger 16 and a blower 17; an expansion device 18 such as a thermal expansion valve, an accurater or the like; and a compressor 19. In the normal cooling cycle, the compressor discharges its compressed refrigerant along the discharge line 21 to the outdoor unit 11, which acts to condense the refrigerant and passes it along line 22 to the expansion device 18. Here, the liquid refrigerant is allowed to expand to a gas where it enters the evaporator coil 16 to cool the air being circulated over the coil by the blower 17. The heated refrigerant gas then passes along line 23 to the compressor to complete the cycle. While the present invention is herein described in connection with an air conditioning system, it should be understood that it can just as well be used in a heat pump system wherein the direction of refrigerant is made to flow in the opposite direction by way of a four way valve.

While the conventional air conditioning system normally has a compressor driven at a constant speed, the present invention involves the use of a variable speed drive 24 and a controller 26 which functions to monitor the operating conditions of the system and to provide control signals to the variable speed drive 24 by way of line 27. The variable speed drive 24 may be an AC motor driven by an inverter, or it may be a DC motor that is electrically commutated. Examples of such variable speed drives are the model CVA-0150 Variable Speed Compressor, commercially available from Copeland Corporation and controlled by an Inverter Assembly available from Carrier Corporation as part no. 38QV400094, or an electrically commutated motor (ECM) of a type commercially available from General Electric Company. In any case, the speed of the motor is varied by speed command signals from the controller 26 by way of lines 27 in response to sensed ambient and system conditions. In general, the motor speed is increased for operation under high load conditions and decreased for operation under low load conditions.

In addition to controlling the variable speed drive 24, the controller 26 may be employed to provide speed command signals to variable speed motors 28 and 29 of the respective outdoor fan 11 and indoor blower 17 along lines 31 and 32, respectively.

Figure 2:
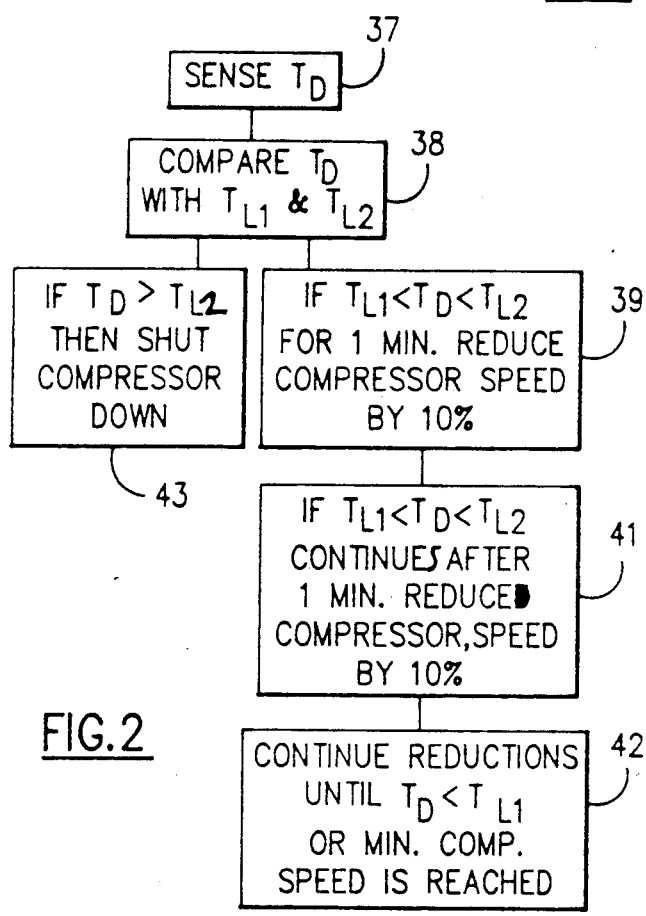
FIG. 2 is a flow chart illustrating the method of the present invention.

In accordance with the present invention, in addition to the normal control of the variable speed drive 24 of the compressor 19, the controller 26 functions to vary the speed of the variable speed drive 24 in such a way as to prevent excessive temperatures in the compressor discharge line 21. This is accomplished by way of a discharge temperature sensor 33 which communicates with the controller 26 by way of line 34. Electrical signals representative of the sensed discharge temperatures $T_D$ are passed along line 34 to a comparator 36 in the controller 26. This step is shown in block 37 of FIG. 2. The comparator 36 then compares the sensed temperature $T_D$ with a predetermined temperature limit $T_{L1}$ as shown at block 38. A temperature limit which has been found suitable for this purpose is 230 F. If that predetermined temperature limit $T_{L1}$ is exceeded for more than a predetermined time period such as, for example, one minute, then the compressor speed is reduced by a predetermined amount. For example, the speed of the motor may be reduced by 10%. This is shown in block 39 of FIG. 2. If, after a suitable predetermined time limit (e.g. one minute), the temperature limit $T_{L1}$ continues to be exceeded, then the speed of the motor is further reduced by a given amount such as, for example, 10% (see block 41). This process is continued until the temperature $T_D$, of the discharge gas is reduced below the predetermined limit $T_{L1}$ or the minimum compressed operating speed is reached as shown in block 42. The compressor will then continue to operate at that speed for the remaining portion of the cycle unless the discharge temperature $T_D$ again rises above the allowed limit $T_{L1}$, in which case the speed is then further reduced, but not below the minimum compressor operating speed.

If, at block 38, the comparator determines that the temperature $T_D$ of the discharge gas exceeds a higher temperature limit, $T_{L2}$ representative of a condition that may be harmful to continue the operation of the compressor (e.g. 240 F.), then the compressor is shut down as shown in block 43.

While the invention has been described with some specificity as shown in a preferred embodiment, it will be recognized by those skilled in the art that various modifications and alternate constructions can be made thereto while remaining within the scope and spirit of the present invention.

What is claimed is:

1. An improved air conditioning system of a type having an evaporator and condenser coils, an expansion device, and a compressor with a variable speed drive mechanism, wherein the improvement comprises;
    a sensor for sensing a discharge temperature of the compressor;
    a comparator for receiving and comparing said discharge temperature with a first predetermined threshold temperature;
    and a control system for decreasing the speed of the variable speed compressor drive when said comparator indicates that said discharge temperature exceeds said first predetermined threshold temperature.

2. An improved air conditioning system as set forth in claim 1 wherein said control system is operable to decrease the speed of the variable speed compressor drive only after said discharge temperature exceeds said first predetermined threshold temperature for a first predetermined period of time.

3. An improved air conditioning system as set forth in claim 2 wherein said control system is operable to further decrease the speed of the variable speed compressor drive when said discharge temperature continues to exceed said first predetermined threshold temperature for a second predetermined period of time.

4. An improved air conditioning system as set forth in claim 3 wherein said control system continues to incrementally decrease the speed of the variable speed compressor drive until said discharge temperature is below said first predetermined threshold temperature.

5. An improved air conditioning system as set forth in claim 1 wherein said control system is operable to shut off said variable speed compressor drive when said comparator indicates that said discharge temperature exceeds a second predetermined threshold temperature higher than said first predetermined threshold temperature.

6. An improved method of operating an air conditioning system of the type having evaporator and condenser coils, an expansion device, and a compressor with a variable speed drive, wherein the improvement comprises the steps of;
    sensing the discharge temperature of the compressor;
    comparing said discharge temperature with a first predetermined threshold temperature; and
    responsively decreasing the speed of the variable speed compressor drive when said comparing step indicates that said discharge temperature exceeds said first predetermined threshold temperature.

7. The method as set forth in claim 6 wherein said step of decreasing the speed of the variable speed compressor drive is accomplished only after said discharge temperature exceeds said first predetermined threshold temperature for a first predetermined period of time.

8. The method as set forth in claim 6 and including the further step of further decreasing the speed of the variable speed compressor drive when said discharge temperature continues to exceed said first predetermined threshold temperature for a second predetermined period of time.

9. The method as set forth in claim 6 and including the further steps of continuing to incrementally decrease the speed of the variable speed compressor drive until said discharge temperature has decreased to a level below said first predetermined threshold temperature.

10. The method as set forth in claim 6 wherein, if in said comparing step said discharge temperature exceeds a second predetermined threshold temperature higher than said first predetermined threshold temperature, then the compressor drive is shut off.

* * * * *